(12) United States Patent
Freeman et al.

(10) Patent No.: US 8,607,206 B2
(45) Date of Patent: Dec. 10, 2013

(54) AUTOMATIC SYNCHRONOUS-TO-ASYNCHRONOUS SOFTWARE APPLICATION CONVERTER

(75) Inventors: Nathan T. Freeman, Canton, GA (US); Colin Macdonald, Canton, GA (US); Tim Tripcony, Canton, GA (US)

(73) Assignee: GROUP Business Software AG, New York, NY (US)

( * ) Notice: Subject to any disclaimer, the term of this patent is extended or adjusted under 35 U.S.C. 154(b) by 247 days.

(21) Appl. No.: 13/245,388

(22) Filed: Sep. 26, 2011

(65) Prior Publication Data

US 2012/0079463 A1 Mar. 29, 2012

Related U.S. Application Data

(60) Provisional application No. 61/386,298, filed on Sep. 24, 2010.

(51) Int. Cl.
*G06F 9/44* (2006.01)
*G06F 9/45* (2006.01)

(52) U.S. Cl.
USPC ........... 717/137; 717/104; 717/107; 717/110; 717/114; 717/116; 717/117; 717/126; 717/136; 717/143; 717/152; 717/168

(58) Field of Classification Search
None
See application file for complete search history.

(56) References Cited

U.S. PATENT DOCUMENTS

| | | | |
|---|---|---|---|
| 5,276,880 A * | 1/1994 | Platoff et al. | 717/143 |
| 6,052,530 A * | 4/2000 | Buzbee et al. | 717/153 |
| 6,219,831 B1 | 4/2001 | Ono | 717/5 |
| 6,314,429 B1 | 11/2001 | Simser | 707/103 |
| 6,986,101 B2 | 1/2006 | Cooper et al. | 715/513 |
| 7,069,504 B2 | 6/2006 | Mani et al. | 715/513 |
| 7,203,866 B2 * | 4/2007 | Di Fabbrizio et al. | 717/114 |
| 7,272,821 B2 | 9/2007 | Chittar et al. | 717/116 |
| 7,370,318 B1 * | 5/2008 | Howe et al. | 717/110 |
| 7,539,974 B2 * | 5/2009 | Beck et al. | 717/117 |
| 7,640,536 B1 * | 12/2009 | Whalen et al. | 717/126 |
| 7,908,597 B2 * | 3/2011 | Nishiyama et al. | 717/152 |
| 2005/0039173 A1 | 2/2005 | Tondreau et al. | 717/136 |
| 2007/0011669 A1 * | 1/2007 | Varma et al. | 717/168 |
| 2007/0169012 A1 * | 7/2007 | Tan | 717/136 |
| 2008/0244539 A1 * | 10/2008 | Rajamani et al. | 717/140 |
| 2009/0064091 A1 * | 3/2009 | Tonkin et al. | 717/104 |
| 2010/0131921 A1 * | 5/2010 | Dyer et al. | 717/107 |
| 2010/0313184 A1 * | 12/2010 | Gustafsson et al. | 717/116 |

OTHER PUBLICATIONS

Nuno Preguica et al., Integrating Synchronous and Asynchronous Interactions in Groupware Application, 2005, [Retrieved on Mar. 5, 2013]. Retrieved from the internet: <URL: http://download.springer.com/static/pdf/342/chp%253A10.1007%252F11560296_7.pdf?auth66=1363809176_81a5b3bd850f53f2dce72aa643fdc38b&ext=.pdf> 16 Pages (89-104).*

(Continued)

*Primary Examiner* — Don Wong
*Assistant Examiner* — Anibal Rivera
(74) *Attorney, Agent, or Firm* — Sunstein Kann Murphy & Timbers LLP

(57) ABSTRACT

A computer-implemented method of generating output computer code, for an application executable via a server running application logic in communication with a client running a presentation layer for the application, from input computer code of a synchronous application in which logic and presentation layers run locally on a single computer. The output code runs asynchronously.

24 Claims, 19 Drawing Sheets

(56) References Cited

OTHER PUBLICATIONS

Peter A. Buhr et al., Synchronous and Asynchronous Handling of Abnormal Events in the uSystem , 1992, [Retrieved on Mar. 5, 2013]. Retrieved from the internet: <URL: http://bluecoat-02/?cfru=aHR0cDovL2NpdGVzWVyeC5pc3QucHN1Lm VkdS92aWV3ZG9jL2Rvd25sb 2FkP2RvaT0xMC4xLj EuMTMuODg2MSZyZXA9cm VwMSZ0eXBlPXBkZg==> 42 Pages (735-776).*
Thibaud Lopez Schneider, "Writing Effective Asynchronous XmlHttpRequests," http://www.thibaudlopez.net/xhr/Writing%20effective%20asynchronous%20XmlHttpRequests.pdf, 52 pages, May 27, 2008.
Houle, Pau,l "Converting a Synchronous Program Into an Asynchronous Program," Generation 5, http://gen5.info/q/2008/08/13/converting-a-synchronous-program-into-an-asynchronous-program/, 9 pages, Aug. 13, 2008.
Zef Hemel, "On Asynchronous Programming," http://zef.me/2726/on-asynchronous-programming, 8 pages, Jan. 26, 2010.
European Patent Office, Extended European Search Report regarding International patent application No. EP 11182829.9, 13 pages, dated Dec. 8, 2011.
"Creating a database," Lotus Notes 6.5 Help, Lotus.com, 2 pages, Jun. 11, 2003, http://www.mcit.gov.cy/help/help65_client.nsf/f4b82fbb75e942a6852566ac0037f284/9dd8bf2f3 65d6b578256dff0061eee9?OpenDocument.
"Notes templates," Lotus Notes 6.5 Help, Lotus.com, 1 page, Jun. 11, 2003, http://www-12.lotus.com/ldd/doc/domino_notes/6.5m2/help65_client.nsf/f4b82fbb75e942a6852566ac0037f284/80973fe1921de23e852 56d42005848b7?OpenDocument.
"What is Lotus Formula language?," TechTarget, 3 pages, Mar. 6, 2007, http://searchdomino.techtarget.com/generic/0,295582,sid4_gci1237176,00.html.
"eXtensible Server pages," Wikipedia.org, 1 page, Nov. 15, 2007, http://en.wikipedia.org/w/index.php?title=EXtensible_Server_Pages&oIdid=171773630.
"LotusScript," Wikipedia.org, 1 page, Jan. 30, 2009, http://en.wikipedia.org/w/index.php?title=LotusScript&oldid=267469954.
"Javascript Simple Syndication," Wikipedia.org, 1 page, Feb. 19, 2009, http://en.wikipedia.org/w/index.php?title=Javascript_Simple_Syndication&oldid= 271729790.
"Lotus documentation," Wikipedia.org, 2 pages, Mar. 1, 2009, http://web.archive.org/web/20090301122720/http://www.ibm.com/developerworks/lotus/documentation/.
"Client-side," Wikipedia.org, 2 pages, May 7, 2009, http://en.wikipedia.org/w/index.php?title=Cliensside&oldid=288570933.
"XPages," Jul. 30, 2009, 1 page, Wikipedia.org, http://en.wikipedia.org/w/index.php?title=XPages&oldid=305117289.
"Does Java need Closures?," Stack Overflow, 10 pages, May 5, 2009, http://web.archive.org/web/20090505072617/http://stackoverflow.com/questions/50255/ does-java-need-closures.
"Service Modeling Language," Wikipedia.org, 3 pages, May 27, 2009, http://en.wikipedia.org/w/index.php?title=Service_Modeling_Language &oldid=292732918.
"IBM Software Services for Lotus," 2 pages, Jun. 20, 2009, http://web.archive.org/web/20090620230601/http://www-01.ibm.com/software/lotus/services/.
"IBM Lotus Domino," Wikipedia.org, 3 pages, Aug. 18, 2009, http://en.wikipedia.org/w/index.php?title=IBM_Lotus_Domino&oldid=308717509.
Siracusa, John "Mac OS X 10.6 Snow Leopard: the Ars Technica review," 3 pages, Aug. 31, 2009, http://web.archive.org/web/20091003023937/http://arstechnica.com/apple/reviews/2009/08/mac-os-x-10-6.ars/10.
Siracusa, John, "Mac OS X 10.6 Snow Leopard: the Ars Technica review-Grand Central Dispatch," 3 pages, Aug. 31, 2009, http://arstechnica.com/apple/reviews/2009/08/mac-os-x-10-6.ars/12.
"JAR (file format)," Wikipedia.org, 4 pages, Sep. 4, 2009, http://en/wikipedia.org/w/index.php?title=JAR_(file_format)&oldid=311828548.
"Lotus Software," Wikipedia.org, 6 pages, Sep. 6, 2009, http://en.wikipedia.org/w/index.php?title=Lotus_Software&oldid=312144287.
"ECMAScript," Wikipedia.org, 9 pages, Sep. 8, 2009, http://en.wikipedia.org/w/index.php?title=ECMAScript&oldid=312563127.
"Dynamic HTML," Wikipedia.org, 4 pages, Sep. 10, 2009, http://en.wikipedia.org/w/index.php?title=Dynamic_HTML&oldid=312997945.
"Interpreter (computing)," Wikipedia.org, 4 pages, Sep. 14, 2009, http://en.wikipedia.org/w/index.php?title=Interpreter_(computing)& oldid =313876210.
"Grand Central Dispatch," Wikipedia.org, 3 pages, Sep. 14, 2009, http://en.wikipedia.org/w/index.php?title=Grand_Central_Dispatch&oldid=313914547.
"Web application framework," Wikipedia.org, 8 pages, Sep. 14, 2009, http://en.wikipedia.org/w/index.php?title=Web_application_framework&oldid=313723045.
"Ajax framework," Wikipedia.org, 4 pages, Sep. 16, 2009, http://en.wikipedia.org/w/index.php?title=Ajax_framework&oldid=314374485.
"Server-side JavaScript," Wikipedia.org, 10 pages, Sep. 16, 2009, http://en.wikipedia.org/w/index.php?title=Server-side_JavaScript& oldid =314442936.
"Application programming interface," Wikipedia.org, 5 pages, Sep. 20, 2009, http://en.wikipedia.org/w/index.php?title=Application_programming_interface&oldid=315102172.
"Ajax (programming)," Wikipedia.org, 5 pages, Sep. 21, 2009, http://en.wikipedia.org/w/index.php?title=Ajax_(programming)&oldid=315323113.
"XMLHttpRequest," Wikipedia.org, 7 pages, Sep. 21, 2009, http://en.wikipedia.org/w/index.php?title=XMLHttpRequest&oldid=315285184.
"Document Object Model," Wikipedia.org, 5 pages, Sep. 21, 2009, http://en.wikipedia.org/w/index.php?title=Document_Object_Model&oldid=315268341.
"C Sharp (programming language)," Wikipedia.org, 13 pages, Sep. 21, 2009, http://en.wikipedia.org/w/index.php?title=C_Sharp_(programming_language) &oldid=315210935.
".Net Framework," Wikipedia.org, 13 pages, Sep. 21, 2009, http://en.wikipedia.org/w/index.php?title=.NET_Framework&oldid=315306601.
"Client-side Java Script," Wikipedia.org, 6 pages, Sep. 23, 2009, http://en.wikipedia.org/w/index.php?title=Clientside_JavaScript&oldid=315645739.
"XSLT," Wikipedia.org, 10 pages, Sep. 22, 2009, http://en.wikipedia.org/w/index.php?title=XSLT&oldid=315547966.
"XML," Wikipedia.org, 15 pages, Sep. 23, 2009, http://en.wikipedia.org/w/index.php?title=XML&oldid=315673095.
"JavaScript," Wikipedia.org, 12 pages, Jan. 30, 2009, http://en.wikipedia.org/w/index.php?title=JavaScript&oldid=315640806.
"JSON," Wikipedia.org, 9 pages, Sep. 23, 2009, http://en.wikipedia.org/w/index.php?title=JSON&oldid=315709159.
"JavaScript Style Sheets," Wikipedia.org, 2 pages, Sep. 23, 2009, http://en.wikipedia.org/w/index.php?title=JavaScript_Style_Sheets&oldid=315763126.
"Cascading Style Sheets," Wikipedia.org, 12 pages, Sep. 23, 2009, http://en.wikipedia.org/w/index.php?title=Cascading_Style_Sheets&oldid= 315687817.
"XML Schema (W3C)," Wikipedia.org, 6 pages, Sep. 23, 2009, http://en.wikipedia.org/w/index.php?title=XML_Schema_(W3C)& oldid=315637121.
"Java (programming language)," Wikipedia.org, 15 pages, Sep. 23, 2009, http://en.wikipedia.org/w/index.php?title=Java_(programming_language)&oldid=315774811.

(56) References Cited

OTHER PUBLICATIONS

"IBM Lotus Notes," Wikipedia.org, 9 pages, Sep. 23, 2009, http://en.wikipedia.org/wiki/IBM_Lotus_Notes.

"DXL," Wikipedia.org, 1 page, Oct. 12, 2009, http://en.wikipedia.org/w/index.php?title=DXL&oldid=319343102.

"Generating Deferreds," Twistedmatrix, 5 pages, Jan. 8, 2010, http://web.archive.org/web/20100108134835/http://twistedmatrix.com/documents/current/core/howto/gendefer.html.

Florenzano, Eric, "How do we kick our synchronous addiction?," 14 pages, Feb. 8, 2010, http://www.eflorenzano.com/blog/post/how-do-we-kick-our-synchronous-addiction.

"Java Server Scripts," Wikipedia.org, 1 page, Sep. 15, 2010, http://en.wikipedia.org/wiki/Java_Server_Scripts.

* cited by examiner

Input Formula Code x := y + @Prompt([OkCancelEdit]; "t1"; "p1"; "d1") + z ;

Abstract Syntax Tree (AST)

```
Formula () ......................................._
    AssignmentExpression () ......................  B
        Identifier (x) ...........................  _
        Add () ...................................  B
            Add () ...............................    B
                Identifier (y) ...................    _
                AtFunction (Prompt) ..............      B
                    Keyword (OkCancelEdit) .......      _
                    StringLiteral (t1) ...........      _
                    StringLiteral (p1) ...........      _
                    StringLiteral (d1) ...........      _
            Identifier (z) .......................    _
```

FIG. 7

Translated Abstract Syntax Tree (AST)

```
Formula () ..........................................................
    AssignmentExpression () ........................................ |
        Identifier (tmp_0) ......................................... |
        Identifier (y) ............................................. |
    AssignmentExpression () ........................................ B
        Identifier (tmp_1) ......................................... |
        AtFunction (Prompt) ........................................ |
            Keyword (OkCancelEdit) ................................. | B
            StringLiteral (t1) ..................................... |  |
            StringLiteral (p1) ..................................... |  |
            StringLiteral (d1) ..................................... |  |
---------------------------------------------------------------------------Boundary
    AssignmentExpression () ........................................ |
        Identifier (x) ............................................. |
        Add () ..................................................... |
            Identifier (tmp_0) ..................................... |  |
            Identifier (tmp_1) ..................................... |  |
            Identifier (z) ......................................... |
```

Output Formula Code

```
tmp_0 := y ;
tmp_1 := @Prompt(
    [OkCancelEdit];
    "t1";
    "p1";
    "d1"
) ;
x := tmp_0 + tmp_1 + z ;
```

FIG. 8

Output Server-Side JavaScript (SSJS)

```
var x = resolve( "x", this ) ;
var y = resolve( "y", this ) ;
var z = resolve( "z", this ) ;
var tmp_0, tmp_1 ;
tmp_0 = y ;
@Prompt(
        "[OkCancelEdit]",
        "t1",
        "p1",
        "d1",
        "tail_0"
) ;

/*func_start*/function tail_0( responseData ) {
  tmp_1 = responseData;
  x = tmp_0 + tmp_1 + z ;
  return x ;
}/*func_end*/
```

*FIG. 9*

Translated Abstract Syntax Tree (AST)

```
Formula () ........................................_
    AssignmentExpression () ........................    _
        Identifier (tmp_2) ..........................    _
        Identifier (b) ..............................    _
    AssignmentExpression () ........................    B
        Identifier (tmp_3) ..........................    _
        AtFunction (Prompt) .........................    B
            Keyword (OkCancelEdit) ..................    _
            StringLiteral (t1) ......................    _
            StringLiteral (p1) ......................    _
            StringLiteral (d1) ......................    _
---------------------------------------------------------------Boundary
    AssignmentExpression () ........................    _
        Identifier (a) ..............................    _
        Add () ......................................    _
            Add () ..................................    _
                Identifier (tmp_2) ..................    _
                Identifier (tmp_3) ..................    _
            Identifier (c) ..........................    _
    AssignmentExpression () ........................    _
        Identifier (tmp_0) ..........................    _
        Identifier (y) ..............................    _
    AssignmentExpression () ........................    B
        Identifier (tmp_1) ..........................    _
        AtFunction (Prompt) .........................    B
            Keyword (OkCancelEdit) ..................    _
            StringLiteral (t2) ......................    _
            StringLiteral (p2) ......................    _
            StringLiteral (d2) ......................    _
---------------------------------------------------------------Boundary
    AssignmentExpression () ........................    _
        Identifier (x) ..............................    _
        Add () ......................................    _
            Add () ..................................    _
                Identifier (tmp_0) ..................    _
                Identifier (tmp_1) ..................    _
            Identifier (z) ..........................    _
        Add () ......................................    _
            Identifier (a) ..........................    _
            Identifier (x) ..........................    _
```

*FIG. 11*

Output Formula Code

```
tmp_2 := b ;
tmp_3 := @Prompt(
        [OkCancelEdit];
        "t1";
        "p1";
        "d1"
) ;
a := tmp_2 + tmp_3 + c ;
tmp_0 := y ;
tmp_1 := @Prompt(
        [OkCancelEdit];
        "t2";
        "p2";
        "d2"
) ;
x := tmp_0 + tmp_1 + z ;
a + x ;
```

FIG. 12

Output Server-Side JavaScript (SSJS)

```
var a = resolve( "a", this ) ;
var b = resolve( "b", this ) ;
var c = resolve( "c", this ) ;
var x = resolve( "x", this ) ;
var y = resolve( "y", this ) ;
var z = resolve( "z", this ) ;
var tmp_0, tmp_1, tmp_2, tmp_3 ;
tmp_2 = b ;
@Prompt(
        "[OkCancelEdit]",
        "t1",
        "p1",
        "d1",
        "tail_0"
) ;

/*func_start*/function tail_0( responseData ) {
  tmp_3 = responseData;
  a = tmp_2 + tmp_3 + c ;;
  tmp_0 = y ;;
  @Prompt(
          "[OkCancelEdit]",
          "t2",
          "p2",
          "d2",
          "tail_1"
  ) ;
}/*func_end*/

/*func_start*/function tail_1( responseData ) {
  tmp_1 = responseData;
  x = tmp_0 + tmp_1 + z ;;
  return a + x ;
}/*func_end*/
```

FIG. 13

Input Formula Code

```
@If (
        a = @Prompt([OkCancelEdit]; "t1"; "p1"; "d1") ;
        1 ;
        0
) ;
```

Abstract Syntax Tree (AST)

```
Formula () ........................................_
    AtIf (If) ..................................... B
        Equals () ................................. B
            Identifier (a) ........................ _
            AtFunction (Prompt) ................... B
                Keyword (OkCancelEdit) ............ _
                StringLiteral (t1) ................ _
                StringLiteral (p1) ................ _
                StringLiteral (d1) ................ _
        IntegerLiteral (1) ........................ _
        IntegerLiteral (0) ........................ _
```

FIG. 14

Translated Abstract Syntax Tree (AST)

```
Formula () ........................................._
    AssignmentExpression () .......................    _
        Identifier (tmp_1) ........................    _
        Identifier (a) ............................    _
    AssignmentExpression () .......................    B
        Identifier (tmp_2) ........................    _
        AtFunction (Prompt) .......................    B
            Keyword (OkCancelEdit) ................    _
            StringLiteral (t1) ....................    _
            StringLiteral (p1) ....................    _
            StringLiteral (d1) ....................    _
------------------------------------------------------------------Boundary
    AssignmentExpression () .......................    _
        Identifier (tmp_0) ........................    _
        Equals () .................................    _
            Identifier (tmp_1) ....................    _
            Identifier (tmp_2) ....................    _
    AtIf (If) .....................................    _
        Identifier (tmp_0) ........................    _
        IntegerLiteral (1) ........................    _
        IntegerLiteral (0) ........................    _
```

Output Formula Code

```
tmp_1 := a ;
tmp_2 := @Prompt(
        [OkCancelEdit];
        "t1";
        "p1";
        "d1"
) ;
tmp_0 := tmp_1 = tmp_2 ;
@If(
        tmp_0;
        1;
        0
) ;
```

FIG. 15

Output Server-Side JavaScript (SSJS)

```
var a = resolve( "a", this ) ;
var tmp_0, tmp_1, tmp_2 ;
tmp_1 = a ;
@Prompt(
        "[OkCancelEdit]",
        "t1",
        "p1",
        "d1",
        "tail_0"
) ;

/*func_start*/function tail_0( responseData ) {
  tmp_2 = responseData;
  tmp_0 = tmp_1 == tmp_2 ;;
  return @If(
          tmp_0,
          1,
          0
  ) ;
}/*func_end*/
```

FIG. 16

Input Formula Code

```
@If (
        a = 0 ;
        b := @Prompt([OkCancelEdit]; "t1"; "p1"; "d1") ;
        b := 1
) ;
```

Abstract Syntax Tree (AST)

```
Formula () ......................................._
    AtIf (If) ..................................   B
        Equals () ..............................   _
            Identifier (a) .....................   _
            IntegerLiteral (0) .................   _
        AssignmentExpression () ................   B
            Identifier (b) .....................   _
            AtFunction (Prompt) ................   B
                Keyword (OkCancelEdit) .........   _
                StringLiteral (t1) .............   _
                StringLiteral (p1) .............   _
                StringLiteral (d1) .............   _
        AssignmentExpression () ................   _
            Identifier (b) .....................   _
            IntegerLiteral (1) .................   _
```

*FIG. 17*

Translated Abstract Syntax Tree (AST)

```
Formula () ..........................................._
    AtIf (If) .....................................  B
        Equals () .................................    _
            Identifier (a) .........................        _
            IntegerLiteral (0) .....................        _
        AssignmentExpression () ....................  B
            Identifier (b) .........................        _
            AtFunction (Prompt) ....................  B
                Keyword (OkCancelEdit) .............        _
                StringLiteral (t1) .................        _
                StringLiteral (p1) .................        _
                StringLiteral (d1) .................        _
        ----------------------------------------------------------Boundary
        AssignmentExpression () ....................    _
            Identifier (b) .........................        _
            IntegerLiteral (1) .....................        _
```

Output Formula Code

```
@If(
        a = 0;
        b := @Prompt(
                [OkCancelEdit];
                "t1";
                "p1";
                "d1"
        );
        b := 1
) ;
```

*FIG. 18*

Output Server-Side JavaScript (SSJS)

```
var a = resolve( "a", this ) ;
var b = resolve( "b", this ) ;
return @If(
        a == 0,
        @Prompt(
                "[OkCancelEdit]",
                "t1",
                "p1",
                "d1",
                "tail_1"
        ),
        @Do(
                b = 1,
                tail_0(b)
        )
) ;

/*func_start*/function tail_0( responseData ) {
  return( responseData )
}/*func_end*/

/*func_start*/function tail_1( responseData ) {
  b = responseData;
  return tail_0( b )
}/*func_end*/
```

FIG. 19

AUTOMATIC SYNCHRONOUS-TO-ASYNCHRONOUS SOFTWARE APPLICATION CONVERTER

CROSS REFERENCE TO RELATED APPLICATIONS

This application claims the benefit of U.S. Provisional Patent Application No. 61/386,298, filed Sep. 24, 2010, titled "Automatic Converter of a Synchronous Application in which Logic and Presentation Software Run Locally on a Single Computer," the entire contents of which are hereby incorporated by reference herein, for all purposes.

TECHNICAL FIELD

The present invention relates to a software application converter (translator) and, more particularly, to a translator that parses a synchronous software application program and automatically generates a semantically equivalent asynchronous software application program.

BACKGROUND ART

A typical computer application program performs three functionally distinct types of operations (presentation, application processing and data management), although operations of these types may be intermingled within the program. Presentation includes inputting data values from a user and/or providing outputs to the user, typically via a user interface. Application processing (sometimes called application logic or business logic) involves executing one or more algorithms that may use the user input values, and possibly data obtained from a data manager, to generate the outputs provided to the user and/or outputs that are then stored by the data manager. The data manager reads and/or writes persistent data stored on a storage device, manages files and the like.

Typical computer programming languages include instructions for performing each of these types of operations. Generalized examples include: GET and PUT (presentation); +, −, *, /, IF, WHILE and GOTO (application processing); and OPEN, CLOSE, SELECT, READ, WRITE and COMMIT (data management). Some statements may involve instructions of two or more of these three types. For example: "IF EXISTS MyFile.txt (ECHO The file already exists)" requires the data manager to ascertain whether a file named "MyFile.txt" exists before the IF instructions conditionally causes the ECHO instruction to display a message on a user interface.

Many application programs, which we here call "legacy applications," have been written in a way that requires executing application logic and presentation instructions of the application on a single computer, i.e., a way that prevents splitting application logic and presentation between two separate computers or between two separately scheduled processes on a single computer (for simplicity, collectively herein referred to as two separate computers). A legacy application may access data stored on a separate server. However, a legacy application is typically written to be executed synchronously, because the application logic and the presentation are executed by a single computer. Consequently, the application logic must stall waiting for user input. "Synchronous" in the context of these legacy applications means that the application logic processing stalls while waiting for user input. Thus, a typical flow of control includes: (1) application logic processing (such as initialization); (2) a stall waiting for a user input; (3) application logic processing of data input by the user; (4) another stall waiting for a subsequent user input; (5) application logic processing of the subsequent data input by the user; etc., possibly ending with a transfer of control (loop) back to an earlier portion of application logic. A more general definition of synchronous is presented below. Examples of legacy applications include applications written in Lotus Notes, Microsoft Office and some programs written in Visual Basic, etc.

Modern applications have been written using a different model in which a presentation layer is executed by one computer, typically a client, and application logic is executed by another computer, such a server. Sometimes the server also acts as a data management server to the application; sometimes a separate server performs the data management function.

The application logic on the server often simultaneously serves several users, each user having an associated client, and each user potentially being at a different stage in the application logic processing. However, while waiting for input from one of the users, the application logic cannot stall the other users' application logic processing. Thus, modern applications are often written according to an asynchronous model, in that the application logic does not stall while waiting for user input. Instead, the application logic is written as a series of routines, and each routine handles a single user input. Each routine is invoked after its corresponding user input becomes available. While waiting for user input, context information particular to the user or the user's "session" is stored. When the user input becomes available, this context information is restored, and the appropriate routine begins executing.

Writing asynchronous applications is considered by many practitioners to be considerably more difficult than writing synchronous applications. Converting a legacy synchronous applications to an asynchronous application typically requires a manual rewriting of the legacy application by a highly skilled programmer.

SUMMARY OF EMBODIMENTS

An embodiment of the present invention provides a computer-implemented method of generating asynchronous application program output computer code from input computer code of a synchronous application. The input computer code is automatically parsed to develop an original syntax tree. A translated syntax tree is automatically developed from the original syntax tree. The translated syntax tree is semantically equivalent to the original syntax tree. At least one of the original syntax tree and the translated syntax tree is automatically analyzed to identify a plurality of nodes. Each node represents a respective instruction that potentially might not be executed as a result of a respective logical contingency. A boundary is automatically defined in the translated syntax tree, logically prior to each identified node. A plurality of asynchronous output computer code segments is automatically generated. Each generated segment corresponds to one of the defined boundaries. Each generated segment contains output computer code generated from a portion of the translated syntax tree. For each generated segment, at least a portion of the generated output computer code depends on a result of the respective logical contingency. Each generated segment contains no output computer code that implements the respective logical contingency.

Optionally, the plurality of asynchronous output computer code segments may be generated, such that for each generated segment a logically earlier segment does contain output computer code that implements the respective logical contingency.

The logical contingency may include at least one of: a user interface instruction; a transfer of control instruction; an external entry point; and a reference to a loosely-defined variable type.

The input computer code of the synchronous application may be of a first computer programming language, and the translated syntax tree may be developed according to a second computer programming language different than the first computer programming language.

The input computer code of the synchronous application may include logic and presentation layers that run locally on a single computer.

The plurality of asynchronous output computer code segments may be generated, such that the generated plurality of asynchronous output computer code segments: are executable via a server; and comprise an application logic layer configured to communicate with a client executing a presentation layer for the synchronous application.

The at least one of the original syntax tree and the translated syntax tree may be analyzed to identify user-interface function calls and nodes of the at least one of the original syntax tree and the translated syntax tree that are dependent on such function calls. The translated syntax tree may be developed, such that the user interface calls are mapped to corresponding translated calls in a client user interface; and each node dependent on a given call is mapped to follow the translated call corresponding to the given call. The plurality of asynchronous output computer code segments may be generated, such that the generated plurality of asynchronous output computer code segments implements an asynchronous client-server model. Before generating the output code, the syntax tree may be remapped according to a dependent program flow.

The asynchronous client-server model may include processes for each user interface function call. These processes may include a process serving a presentation screen to the client. The process may be configured to enable the client to notify the server in the event of a client request for a presentation layer action. These processes may include a process running logical processes until client input is required and storing a callback function and sending to the client a response to the client request. These processes may also include receiving from the client a message asking whether additional user input is required and sending to the client a response message indicating whether additional user input is required. If additional user input is required, these processes may include receiving from the client a request for a presentation characterization by which the additional user input can be obtained. In addition, the presentation characterization may be generated, the presentation characterization may be sent to the client, the additional user input may be received, and the callback function may be run.

Optionally, the foregoing processes may be repeated, beginning at the point of storing the callback function, until no further user input is required.

The input code may be written in a language, and the output code may be written in the same language. The input code may be written in a first language and the output code may be written in a second language that is different from the first language. For example, the language may be JavaScript or Java. For example, the first language may be @Formula and the second language may be JavaScript, or the first language may be LotusScript and the second language may be Java, or the first language may be LotusScript and the second language may be Java, or the first language may be Visual Basic and the second language may be C#, the first language may be Visual Basic and the second language may be Java.

Another embodiment of the present invention provides a computer-implemented system for automatically generating asynchronous application program output computer code from input computer code of a synchronous application. A parser is configured to automatically parse the input computer code to develop an original syntax tree. A syntax tree transformer is configured to automatically develop, from the original syntax tree, a translated syntax tree that is semantically equivalent to the original syntax tree. An analyzer is configured to automatically analyze at least one of the original syntax tree and the translated syntax tree to identify a plurality of nodes. Each identified node represents a respective instruction that potentially might not be executed as a result of a respective logical contingency. A boundary is automatically defined in the translated syntax tree logically prior to each identified node. A code generator is configured to automatically generate a plurality of asynchronous output computer code segments. Each generated segment corresponds to one of the defined boundaries. Each generated segment contains output computer code generated from a portion of the translated syntax tree. For each generated segment, at least a portion of the generated output computer code depends on a result of the respective logical contingency. However, each generated segment contains no output computer code that implements the respective logical contingency.

Optionally, the code generator is configured to generate the plurality of asynchronous output computer code segments, such that for each generated segment a logically earlier segment does contain output computer code that implements the respective logical contingency.

Optionally, the logical contingency comprises at least one of a user interface instruction; a transfer of control instruction; an external entry point; and a reference to a loosely-defined variable type.

Optionally, the input computer code of the synchronous application is of a first computer programming language, and the syntax tree transformer is configured to develop the translated syntax tree according to a second computer programming language different than the first computer programming language.

Yet another embodiment of the present invention provides a computer-implemented method of generating output computer code, for an application executable via a server running application logic in communication with a client running presentation software for the application, from input computer code of a synchronous application in which logic and presentation software run locally on a single computer. The method of this embodiment includes computer processes performing operations, including parsing the input computer code to develop an original syntax tree and analyzing the original syntax tree to identify user-interface function calls and nodes of the tree that are dependent on such function calls. A translated syntax tree is developed from the original syntax tree, wherein the user interface calls are mapped to corresponding translated calls in a client user interface. In addition, each node dependent on a given call is mapped to follow the translated call corresponding to the given call. Output code is generated from the translated syntax tree. The generated output code implements an asynchronous client-server model.

In a further related embodiment, the method further includes: before generating output code, remapping the syntax tree according to a dependent program flow.

Alternatively or in addition, the asynchronous client-server model includes processes, for each user interface function call, including: serving to the client a presentation screen, configured to enable the client to notify the server in the event of a client request for a presentation layer action; running logical processes until client input is required; storing a callback function and sending to the client a response to the client request; receiving from the client a message asking whether additional user input is required; sending to the client a response message indicating whether additional user input is required; if additional user input is required, receiving from the client a request for a presentation characterization by which the additional user input can be obtained; generating the presentation characterization; sending the presentation characterization to the client; receiving the additional user input; and running the callback function.

In a further embodiment, the method further includes repeating the foregoing processes, beginning at the point of storing the callback function, until no further user input is required.

Optionally, the input code is written in a language and the output code is written in the same language. The language may, for example, be JavaScript or Java.

Alternatively, the input code is written in a first language and the output code is written in a second language that is different from the first language. For example, the first language may be @Formula and the second language may be JavaScript. Alternatively, the first language may be LotusScript and the second language may be Java. In yet another related embodiment, the first language may be Visual Basic and the second language may be C#. Alternatively, the first language may be Visual Basic and the second language may be Java.

An embodiment of the present invention provides a computer-implemented method of generating asynchronous application program output computer code from input computer code of a synchronous application, the method comprises automatically parsing the input computer code to develop an original syntax tree, automatically developing, from the original syntax tree, a translated syntax tree that is semantically equivalent to the original syntax tree, automatically analyzing at least one of the original syntax tree and the translated syntax tree to identify a plurality of nodes, each node representing a respective instruction that potentially might not be executed as a result of a respective logical contingency, automatically defining a boundary in the translated syntax tree logically prior to each identified node; and automatically generating a plurality of asynchronous output computer code segments. Each generated segment contains output computer code generated from a portion of the translated syntax tree between two consecutive boundaries. At least a portion of the generated output computer code of each generated segment depends on a result of the respective logical contingency. Each segment contains no output computer code that implements the respective logical contingency.

The automatic generation of the boundaries allows transforming the translated syntax tree of the input computer code into asynchronous computer code segments.

The beginning and the ending of the asynchronous application program output computer code may form a respective first and last boundary.

In a further related embodiment, the method comprises generating the plurality of asynchronous output computer code segments, such that for each generated segment, a logically earlier segment does contain output computer code that implements the respective logical contingency.

BRIEF DESCRIPTION OF THE DRAWINGS

The invention will be more fully understood by referring to the following Detailed Description of Specific Embodiments in conjunction with the Drawings, of which:

FIG. 7 shows an exemplary code snippet and a corresponding abstract syntax tree (AST) representation of the code snippet, according to an embodiment of the present invention.

FIG. 8 shows a semantically equivalent translated AST that is automatically generated from the AST of FIG. 7 and semantically equivalent translated Formula code that may be automatically generated from the AST of FIG. 8, according to embodiments of the present invention.

FIG. 9 shows semantically equivalent Server-Side JavaScript (SSJS) code that may be automatically generated from the AST of FIG. 8, according to embodiments of the present invention.

In a manner similar to that of FIGS. 7-9, FIGS. 10-13 show input Formula code and AST (FIG. 10), translated Formula AST (FIG. 11), generated Formula code (FIG. 12) and generated SSJS code (FIG. 13) of two blocking expressions, according to embodiments of the present invention.

In a manner similar to that of FIGS. 7-9, FIGS. 14-16 show input Formula code and AST (FIG. 14), translated Formula AST and generated Formula code (FIG. 15) and generated SSJS code (FIG. 16) of a blocking @if condition, according to embodiments of the present invention.

In a manner similar to that of FIGS. 7-9, FIGS. 17-19 show input Formula code and AST (FIG. 17), translated Formula AST and generated Formula code (FIG. 18) and generated SSJS code (FIG. 19) of a blocking @If 'then' expression, according to embodiments of the present invention.

DETAILED DESCRIPTION OF SPECIFIC EMBODIMENTS

Definitions. As used in this description and the accompanying claims, the following terms shall have the meanings indicated, unless the context otherwise requires:

A "single computer" is an individual computer for use by an individual user. When logic and presentation software run locally on a single computer, the single computer might still access data, stored on a server, that may be shared with other users.

A "computer" includes a desktop machine, smartphone, tablet device, or personal digital assistant.

A described "process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "process" we do not necessarily require a schedulable entity, although, in some embodiments, a process may be implemented by such a schedulable entity. Furthermore, unless the context otherwise requires, a "process" may be implemented using more than one processor or more than one (single- or multi-processor) computer.

Figure 1:
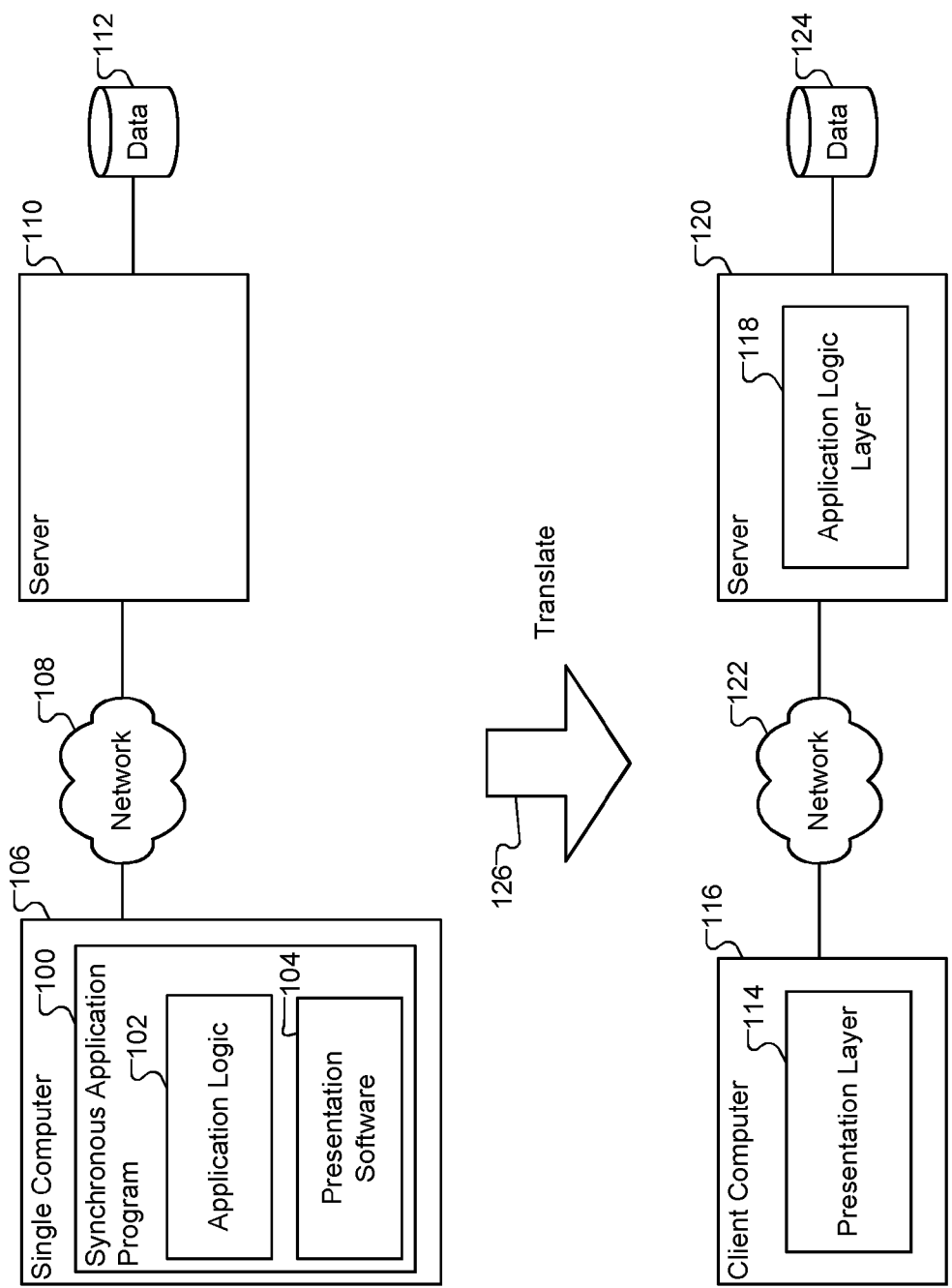
FIG. 1 is a schematic block diagram overview of operation of an embodiment of the present invention.

Embodiments of the present invention automatically translate (convert) a synchronous application program into a semantically equivalent asynchronous application program. That is, the synchronous application program code is parsed, and new asynchronous application program code, functionally equivalent to the parsed code, is emitted, as schematically illustrated in FIG. 1. The parsed synchronous application program 100 includes application logic 102 and presentation software 104. The synchronous application program 100 is executed by a single computer 106. The synchronous application program 100 may communicate, such as via a computer network 108, with a server 110, which serves data 112 to the synchronous application program 100. The server 110 may serve the data 112 to other application programs (not shown). That is, the data 112 may be shared by several application programs (not shown).

The new asynchronous application program code includes a presentation layer 114, executed by a client computer 116, and an application logic layer 118, executed by a server 120. The presentation layer 114 may be implemented as a conventional browser. Thus, no actual new computer code may need to be generated for the presentation layer 114. The presentation layer 114 and the application logic layer 118 may communicate with each other via a computer network 122. As described above, the server 120 may serve data 124 to the application logic layer 118, or another server (not shown) may serve data (not shown) to the application logic layer 118.

Figure 2:
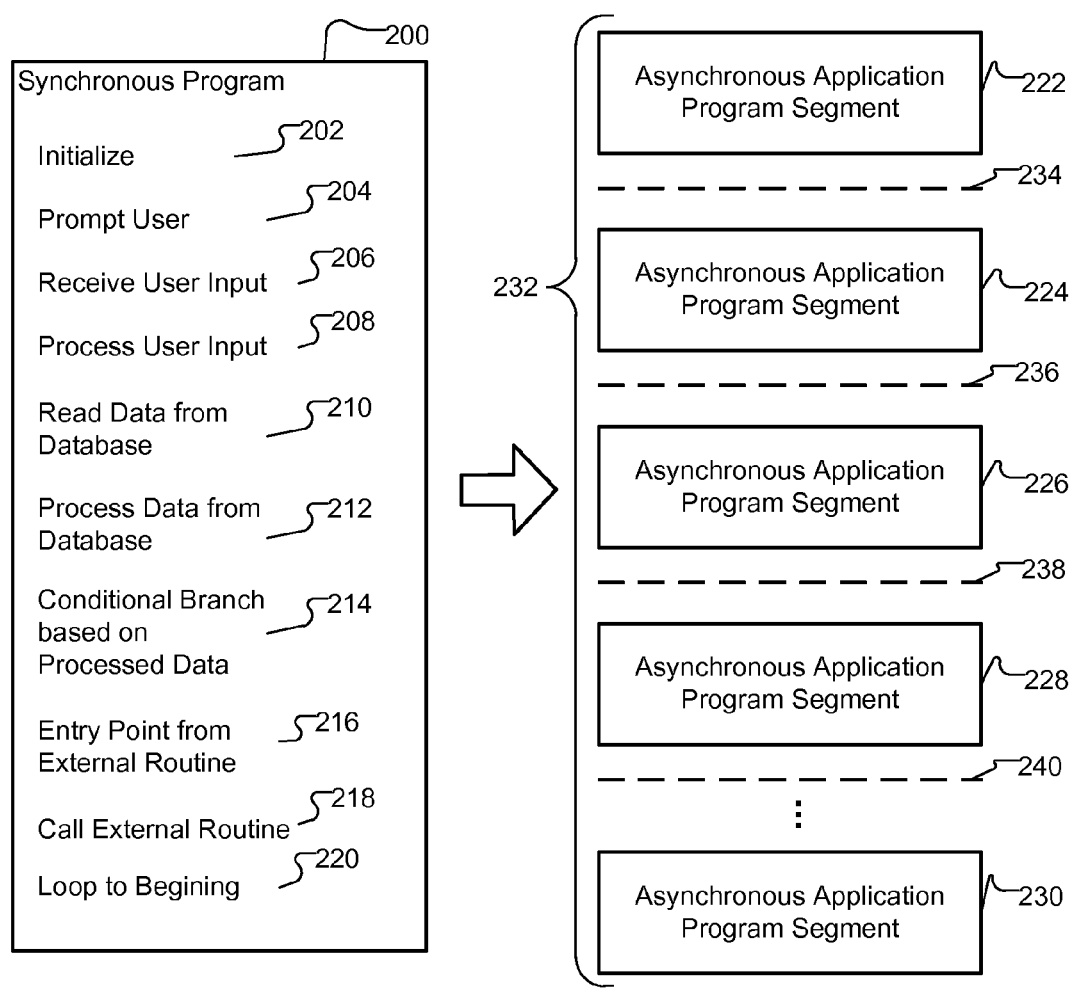
FIG. 2 is a schematic block diagram of a hypothetical synchronous application program and corresponding automatically generated asynchronous application program segments, in accordance with the embodiment of FIG. 1.

As indicated by arrow 126, embodiments of the present invention translate the synchronous application program 100 into a semantically equivalent asynchronous application program that includes the application logic layer 118 and, optionally, the presentation layer 114. The left portion of FIG. 2 is a schematic block diagram of a hypothetical synchronous application program 200, which may be an example of the synchronous application program 100 shown in FIG. 1.

The hypothetical synchronous application program 200 performs several illustrative operations. Each operation may include one or more program statements and/or instructions. At 202, the synchronous application program 200 may, for example, include program code to initialize variables, etc. Next, at 204, the synchronous program 200 may prompt a user for input and at 206 receive the user's input. At 208, the synchronous program 200 may process the received user's input. At 210, data may be read from a remote database, and at 212 the read data may be processed. At 214 the synchronous application 200 may execute a conditional branch, such as a conditional branch based on results of the processing of the data read from the database and/or based on the user's input. At 216, the application program 200 may include an entry point (such as a location represented by a global or universal label), by which an external program (not shown) may call or transfer control to a routine in the synchronous application 200. At 218, the synchronous application program 200 may call or transfer control to an external routine in another application program, library, service routine, application programming interface (API), operating system routine or the like (not shown). At 220, the synchronous application program may conditionally or unconditionally loop back to the beginning of the application program 200 or to another point within the application program 200. As noted, each of the operations 202-220 may be represented by one or more program statements and/or instructions. Furthermore, a single program statement may combine several of the operations 202-220. For example, the statement "IF EXISTS MyFile.txt (ECHO The file already exists)" includes obtaining information from a data manager and then conditionally performing a user output operation, based on the obtained information.

Boundary Identification

In order to generate a semantically equivalent asynchronous application program, embodiments of the present invention automatically parse the synchronous program 200 to identify boundaries, beyond which logical flow potentially might not proceed, i.e., boundaries beyond which a processor potentially might not execute instructions, depending on an external event, as described in more detail below. A situation where logical flow potentially might not proceed is referred to as a logical contingency. For example, a function that collects user input might not complete, because the user might not provide the input. In another example, a branch in a conditional instruction might not be executed, because the condition is not satisfied. Likewise, a global entry point might not be transferred to from an external routine.

These embodiments automatically generate a set of asynchronous application program segments 222-230 (collectively 232), shown on the right side of FIG. 2. In addition, there may be an initial and/or final asynchronous application program segment. Each asynchronous application program segment 222 corresponds to one of the boundaries. The asynchronous application program segment includes instructions that perform processing semantically equivalent to processing performed by a (not necessarily continuous) corresponding portion of the instructions in the synchronous application program 200, up to the boundary. However, the instructions in the generated asynchronous application program segments 232 may not be in the same order as the corresponding instructions in the synchronous application program 200. In addition, the asynchronous application program segments 232 may be generated using a different programming language than the synchronous application program 200. For illustration, boundaries 234-240 are shown by dashed lines between respective adjacent pairs of asynchronous application program segments 232. No corresponding boundaries are shown in the synchronous application program 200, because these boundaries may lie within some single program statements, as well as between single program statements, depending on the coding of the synchronous application program 200. The asynchronous application program segments 232 are generally executed in sequence. However, they may be executed out of sequence, and some of the segments 232 may be skipped, based on control flow logic, user inputs, errors, etc. For example, the last segment 230 may include an error handling routine that is invoked in case of an error, such as an attempted division by zero or a subscript (index) out-of-bound condition. The error handler may return control to one of the other segments, such as after resolving the error.

As noted, boundaries are defined, such that beyond each boundary, logical flow potentially may not proceed, i.e., a processor potentially may not be able to execute instructions beyond the boundary, depending on an external event. All instructions that depend on the event are moved to below the boundary. For example, user input is received at 206 in the synchronous application program 200. The first instruction that relies on this user input cannot be executed until after the user's input has been received. Thus, a boundary is defined logically before this instruction. This instruction in the synchronous application program 200, and subsequent instructions in the synchronous application program 200, is blocked until the user input has been received. It is possible that the user never provides the input, in which case the blocked instruction is never unblocked. In any case, human input time scales are much longer than instruction execution time scales. Thus, even if the user provides the input quickly (relative to the human time scale), the instruction must be blocked for a long time (relative to the instruction execution time scale).

The synchronous application program 200 may include program code that can execute before the user input is received. For example, after the user has been prompted at 204, but before the user input has been received at 206, the synchronous application program 200 may perform various calculations, etc. that do not depend on the user's input. An asynchronous application program segment (assume segment 224) is generated that includes semantically equivalent instructions that perform these calculations, etc. However, the program segment 224 may include semantically equivalent instructions that perform logical processing that is performed after the user's input has been received in the corresponding logic processing of the synchronous application program 200, as long as these instructions do not rely, directly or indirectly, on the user's input. In other words, embodiments of the present invention may, when generating asynchronous application program segments 232, rearrange the application logic of the synchronous application program 200. Some processing logic may be moved to before or after other processing logic, and specifically to positions within the asynchronous application program segment 232 before or after instructions that correspond to instructions in the synchronous application program 200 that may be blocked. However, as noted, instructions are not moved to positions before all their respective required data are available.

Selecting which application logic of the synchronous application program 200 may be safely rearranged is a form of optimization, similar to optimizations performed by modern computer language compilers. Techniques for identifying candidate instructions in the synchronous application program 200 for such optimization and implementing the optimizations are within the capabilities of ordinarily skilled practitioners in the art of optimizing compiler design.

The example given above, of defining a boundary before an instruction that depends on user input, is an example of a general class of instruction known as a blocking instruction. Thus, a boundary should be defined before any instruction that potentially may be blocked from execution, pending an external event. A non-exhaustive list of exemplary potentially blocking instructions includes: input/output instructions that impact a user interface, instructions that request performance by a data manager, particularly if the data manager is remote from the server on which the asynchronous application program segments are executed or if performance by the data manager involves an input/output operation from/to a mechanical peripheral, such as a spinning disk drive; network communications instructions; and timer instructions, such as SLEEP or WAIT.

This process of defining boundaries and generating corresponding asynchronous application program segments 232 continues until all the application logic of the synchronous application program 200 is included in the set 232 of generated asynchronous application program segments. Each asynchronous application program segment 232 ends with an instruction that causes a display on the user interface, a request for a user input or some other blocking instruction. (As will be discussed below, an asynchronous application program segment 232 may end with another type of instruction or begin with a labeled entry point. However, for simplicity of explanation, for the moment we limit the description to blocking instructions.)

Referring back to FIG. 1, when the generated asynchronous application executes, the application logic layer 118 performs functions defined in the generated asynchronous application program segments 232, and the presentation layer 114 provides the user interface. For example, the first asynchronous application program segment 222 is executed by the server 120, which may initialize variables, etc., and end by commanding the presentation layer to prompt the user. The presentation layer 114 may be implemented by a conventional browser, and the asynchronous application program segments 232 may send conventional markups, such as in HTML, XML or JSON, to the presentation layer 114 to cause the presentation layer 114 to render the user interface and collect user inputs and return the inputs to the application logic layer 118.

Once the user has been prompted, the presentation layer 114 notifies the application logic layer 118, which then invokes the next logical asynchronous application program segment 224. For the sake of this example, assume the next segment 224 performs some arithmetic operations and ends by commanding the presentation layer to solicit a user input in response to the previously displayed prompt. Once the presentation layer 114 has collected the user input and sent it to the application logic layer 118, the application logic layer 118 invokes the next logical asynchronous application segment 226, and so on.

Thus, control passes back and forth between the application logic layer 118 and the presentation layer 114, and a chain of asynchronous application program segments 232 is executed. The sequence of instructions collectively executed by the application logic layer 118, i.e., the chain of asynchronous application program segments 232, (and optionally the presentation layer 114) may be thought of as a session dedicated to the user. As noted, the application logic layer 118 may simultaneously (or at least apparently simultaneously, as implemented by a time-shared scheduler/operating system) service many users, each with her own session. Thus, context information for each session must be stored, at least between executions of successive asynchronous application program segments, such as between segments 224 and 226.

Each asynchronous application program segment 232 may store context information that will enable the next logical segment to execute. This context information is preferably stored on the server 120. For example, one embodiment is implemented using the well-known JavaServer Faces (JSF) web application framework, which stores session context information on the server. However, optionally or alternatively, the context information may be passed to the presentation layer 114, and the presentation layer 114 may subsequently return the context information to the application logic layer 118, once the user input has been received (or the blocking event has been resolved, as the case may be). For example, when an asynchronous application program segment 232 ends by invoking the presentation layer, the asynchronous application program segment 232 may include an address of a callback routine in the invocation (and parameters representing the context information to be passed to the callback routine).

The callback routine address may be the address of the next asynchronous application program segment 232 to be executed, and the parameters may include the context information. After the user input has been collected, the presentation layer 114 may invoke the callback function. Optionally or alternatively, a dispatcher in the application logic layer 118 may use the address of the callback routine (or some other portion of the context information) to invoke the appropriate asynchronous application program segment 232 and pass the parameters to the invoked program segment. Other well-known techniques, such as co-routines or lightweight processes, may be used as alternatives to callback routines. In some embodiments, a Java Virtual Machine (JVM) is used for each user session. In these cases, context information may be saved within the JVM, such as while awaiting user input.

As noted, an external event may merely delay execution, i.e., delay unblocking, of an instruction until the blocking situation is resolved. However, it should be recognized that the external event may never be complete. For example, a user may cancel an operation, rather than provide an input. In this case, the blocked-for user input is never provided. The asynchronous application program should, therefore, be generated with a timeout or other mechanism for handling unresolved external events. For example, such a timeout mechanism may be provided by a web server framework that serves the application program.

Boundaries are, therefore, defined for each potentially blocking instruction. In addition, a boundary should be defined for each potential entry point. For example, at 216 (FIG. 2), the application program 200 includes an entry point (such as a location represented by a global or universal label or symbol), by which an external program (not shown) may call or transfer control to a routine in the synchronous application 200. A boundary should be defined logically before such an entry point, because the entry point may never be called (analogous to a blocked-for user input never being received). Furthermore, execution beginning at the entry point should not depend on any event (logically earlier in the logic flow) that has not already occurred. In addition, it is not necessarily possible to predict variable data values upon a transfer of control to the entry point.

Although this example involves a potential transfer of control in from an external routine or program, a boundary should be defined for any potential transfer of control in, even from other portions of the same application program. Thus, any potential conditional or unconditional transfer of control, including IF, GOTO, DO, WHILE, UNTIL, NEXT, CALL, RESUME or ON ERROR GOTO, should have a boundary that corresponds to each potential destination. Thus, for example, a boundary should be defined for each loop in the synchronous application program 200. In the case of a call or transfer from another routine or program, all necessary context should be passed to the entry point, such as via parameters of a CALL instruction.

Optionally, but preferably, a boundary should also be defined for each potential transfer of control out of, or to another location within, an asynchronous application program segment 232, such as via a GOTO or CALL instruction.

In addition, a boundary should be defined for each reference to a variable having a loosely defined type, such as a VARIANT data type, because loosely defined variable types may not have behaviors that are fully determined at compile time. For example, evaluation of a VARIANT data typed variable may involve a function call, which is a transfer of control out of the current control flow.

As noted, some statements (such as complex IF statements, particularly IF statements that reference user inputs) in a synchronous application program 100 (FIG. 1) may involve two or more layers of nesting, with potential blocking instructions or control transfer instructions included at each layer. For example, "IF EXISTS MyFile.txt (ECHO the file already exists)" is nested in that existence of a file named MyFile.txt must be ascertained before the conditional (IF) is executed, and the condition must be evaluated before the ECHO can be executed. These statements should be parsed, from the inner most layer toward the outer most layer, and converted into a series of unary statements. A unary statement can contain at most one instruction that may cause a boundary to be identified. Once such a complex statement is broken down into a series of unary statements (or, equivalently, corresponding nodes in a tree, as described below), the unary statements (or nodes) may be analyzed for placement of boundaries.

As a further note, in many cases, the generated asynchronous application program segments 232 are generated in a language (referred to herein as a "destination language") different than the language of the synchronous application program 200. Thus, statements in the generated language essentially emulate statements in the synchronous application program 200 (referred to herein as a "source language"). This emulation should include emulation of idiosyncrasies of the source language and error conditions. For example, a conditional (ex. IF) statement in the synchronous application program 200 may involve a comparison of two variables, and these variables may be of different data types (ex., string and integer). Depending on the source language, one of these variables may be automatically converted to the type of the other variable to facilitate the comparison. However if, for example, the string variable contains a string (such as "Fred") that does not convert into a numeric value, an error may be thrown within the synchronous application program 200. Consequently, the corresponding generated asynchronous application program segment should emulate the behavior of the synchronous application program 200, even if the destination language does not automatically convert data types. Furthermore, since such a converted conditional statement may generate an error, a boundary should be defined in association with the possibility that control will change as a result of the error occurring.

Source Code Parsing and Destination Code Generation

Figure 3:
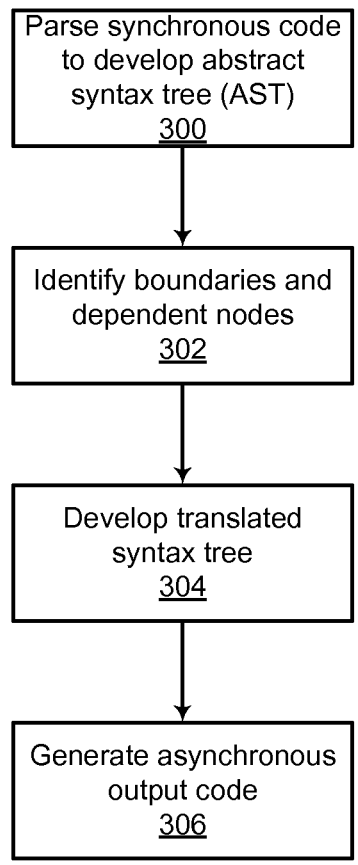
FIG. 3 is a flow chart showing processes operating in accordance with the embodiment of FIG. 1.

In general, the asynchronous application program segments 232 are generated by parsing the program code of the synchronous application program 100 (exemplified by program 200) to generate an abstract syntax tree (AST). The AST is then analyzed to locate boundaries, and the asynchronous application program segments 232 are generated according to the boundaries. Operations involved in generating the asynchronous application program segments 232 are summarized in a flowchart shown in FIG. 3. At 300, the synchronous application program code is parsed to generate a first abstract syntax tree (AST). A conventional tool, such as ANTLR (ANother Tool for Language Recognition), may be used for this purpose. ANTLR takes as input a grammar that specifies a language and generates as output source code for a recognizer for that language. If a grammar for the source language is not available, defining such a grammar is within the capabilities of an ordinarily skilled practitioner in the field of computer language design and analysis or compiler design.

ANTLR allows generating parsers, lexers, tree parsers and combined lexer-parsers. Parsers can automatically generate abstract syntax trees, which can be further processed with tree parsers. ANTLR provides a single consistent notation for specifying lexers, parsers and tree parsers.

At 302, the first AST is analyzed to identify boundaries and nodes that depend on external events (such as user inputs that are obtained by other nodes in the tree), definite and potential transfers of control, references to VARIANT data types, etc., as described above. At 304, a translated syntax tree is developed. The translated syntax tree includes nodes, such that the translated syntax tree is semantically equivalent to the first AST tree. The translated syntax tree is constructed according to the destination language. However, as discussed above, operations may be performed in a different order, according to the translated tree, than according to the first AST. At 306, generated asynchronous application program output code is generated from the translated syntax tree. As noted, the generated code is in the form of asynchronous application program segments, according to the identified boundaries.

Lotus Notes provides an example of a context in which converting synchronous to asynchronous application programs is particularly valuable. Organizations using Lotus Notes applications have decades of investment in a proprietary technology with weak documentation and poor standards support for manipulation of application behavior. Modernizing these applications, whether to account for new client platforms, update design or extend features, involves expensive and delicate manual changes through IBM's proprietary platform, when accomplished according to the prior art. However, automatic conversion using techniques described herein greatly simplify and reduce the cost of such efforts.

One implemented embodiment of the present invention is called Domino Application Translator (DAT), which has been used successfully to convert Lotus Notes synchronous applications to asynchronous applications, as will now be described. DXL (Domino Extensible Language) is a specific version of Extensible Markup Language (XML) for Lotus Domino data. DXL can be used to export a complete user interface and business logic specification of a Lotus Notes application to a defined XML schema. DAT reads an existing Lotus Notes application and generates an XML tree of constituent nodes. DAT analyzes the nodes and maps each node to a corresponding node in Xpages. Xpages is an implementation of the Oracle JavaServer Faces specification for web application servers. The Xpages nodes are recombined to match the original application's tree, creating a new application that is semantically equal to the original application, but based on up-to-date technology.

Figure 4:
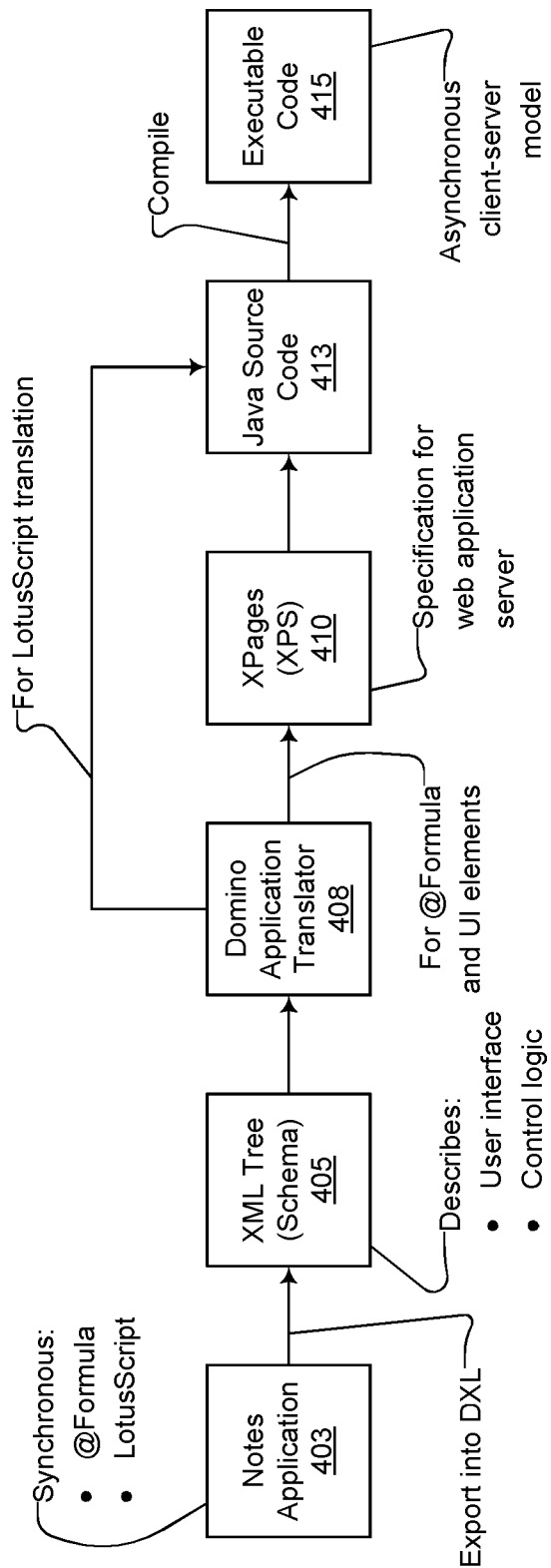
FIG. 4 is a schematic block diagram illustrating software structures, at various stages of processing, in accordance with an embodiment of the present invention.

FIG. 4 is a schematic block diagram illustrating software structures, at various stages of processing, in accordance with an embodiment of the present invention. In this embodiment, a computer-implement method generates output computer code, for an application executable via a server running application logic in communication with a client running presentation software for the application, from input computer code. The input code is a synchronous application in which logic and presentation software run locally on a single computer. Typically data accessed by the application resides on a server distinct from the single computer.

In FIG. 4, the input code can be a Lotus Notes application 403. The Lotus Notes application 403 may be, for example, written in @Formula or in LotusScript, or a combination thereof. An export format, namely DXL, is available for use in the Lotus Notes environment in which the Lotus Notes application 403 is parsed into an XML syntax tree 405 representing structure of the application, with respect to the user interface and control logic.

The Domino Application Translator (DAT) 408 operates on the XML tree 405 to develop, from that tree, a translated syntax tree, shown here as XPages (XPS) 410 having special properties. Namely, (a) the user interface calls and other instructions that cause identification of boundaries in the input computer code are mapped to corresponding translated calls and (b) each node dependent on a given call is mapped to follow the translated call corresponding to the given call. The XPages document 410 defines a specification for a web application server that runs the resulting output code. Accordingly the XPages document 410 is used to generate Java source code 413. The Domino Application Translator 408, in appropriate circumstances (for example, when the input code includes synchronous LotusScript) also translates some of the input code into Java source code. The Java source code in turn is compiled into executable code 415.

Figure 5:
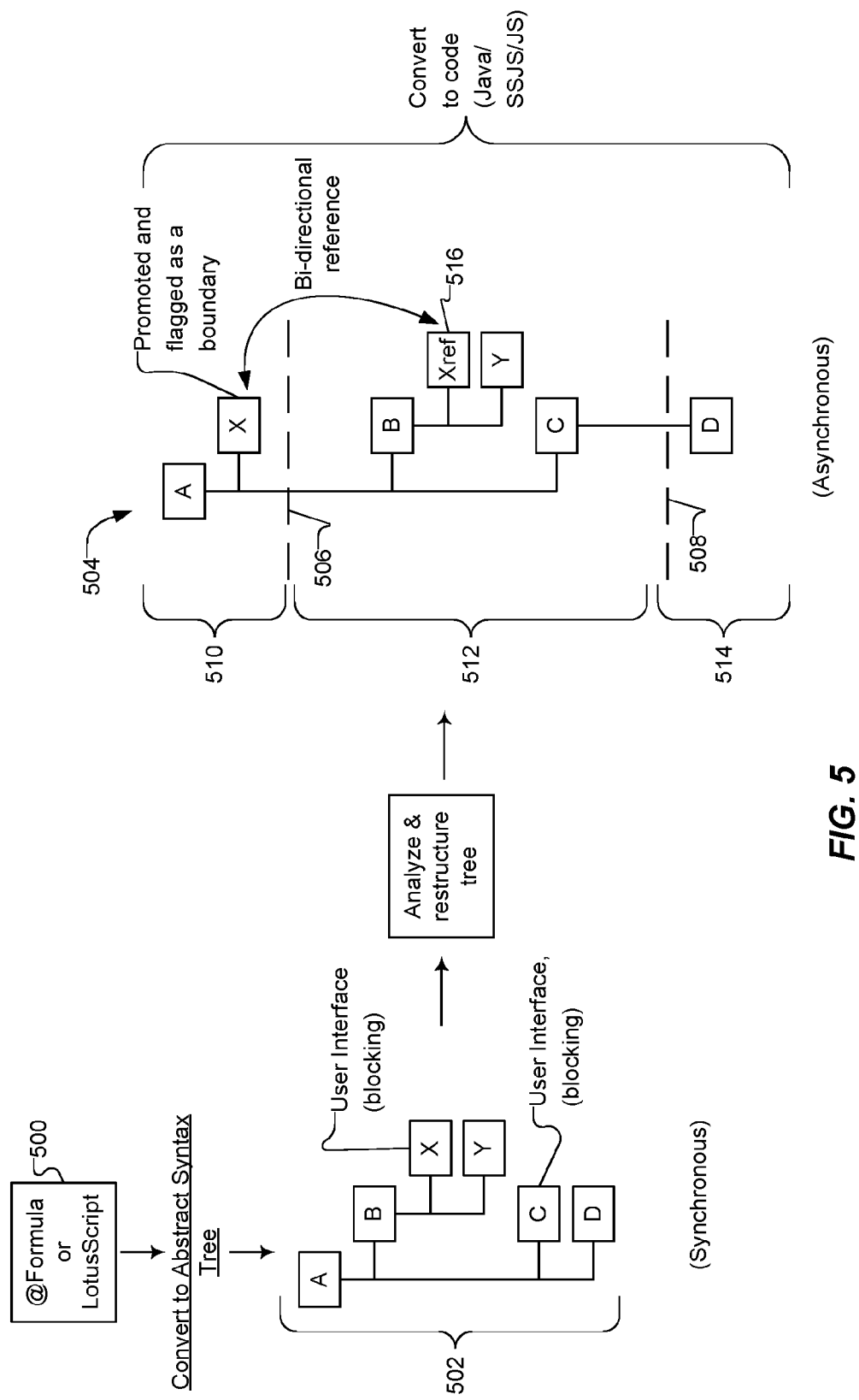
FIG. 5 is a schematic block diagram illustrating an exemplary syntax tree conversion, according to embodiments of the present invention.

FIG. 5 is a schematic block diagram illustrating an exemplary syntax tree conversion, according to embodiments of the present invention. Although a specific source language and a specific destination language are used in this example, the principles described herein apply to other languages. In this example, a synchronous application program 500, written in a source language, such as @Formula and/or LotusScript, is parsed to generate an abstract syntax tree (AST) 502 to characterize the synchronous application program 500. The synchronous application program 500 may, hypothetically, include a user-fillable form, represented by Node A. The form may include a button, represented by Node X.

The AST tree 502 is analyzed to identify boundaries. As noted, signatures for boundaries include user interface function calls (exemplified by X and C in FIG. 5, although such calls may be at any level of the AST 502), as well dynamic program flow control (such as a "GOTO") and other constructs, as described above.

Next a translated syntax tree 504 is developed, shown on the right hand side of FIG. 5. In the translated syntax tree 504, the function call X has been promoted (moved higher in the hierarchy of the tree), so it can be referenced by nodes lower in tree. Although the function call C is blocking, the function call represents a stand-alone statement; function call C is not promoted out of a complex statement, i.e., one that uses a temporary variable while waiting for the blocking situation to be resolved. The translated syntax tree 504 defines an asynchronous pattern, which is used to generate the code of the asynchronous application program. For example, boundaries 506 and 508 delimit three respective program segments 510, 512 and 514.

Function calls X and C may, for example, request user input which, as discussed, would in a synchronous context be blocking. However, in the translated syntax tree 504, function calls X and C are made the last function calls in their respective synchronous application program segments 510 and 512. Thus, once these function calls are made, the session context is stored, and the segment execution ends. References to the user inputs appear only in synchronous application program segments subsequent to the segments in which the function calls X and C appear. For example, Node Xref 516 refers to user input that is sought by function call X.

Promotion is a standard tree pruning operation known in the field of computer science. A promoted node and all its child nodes are moved to become a preceding child of the containing statement block. It should be noted that, at least when dealing with complex syntax, nested statements may exist in a single AST. Promotion should be performed in a way that preserves the syntactic meaning an order of operations, i.e., statements should not be arbitrarily evaluated if their evaluation was not previously dependent on one or more conditional statements. To ascertain what constitutes blocking and boundary nodes, embodiments of the present invention perform operations listed in Table 1.

TABLE 1

Figure 6:
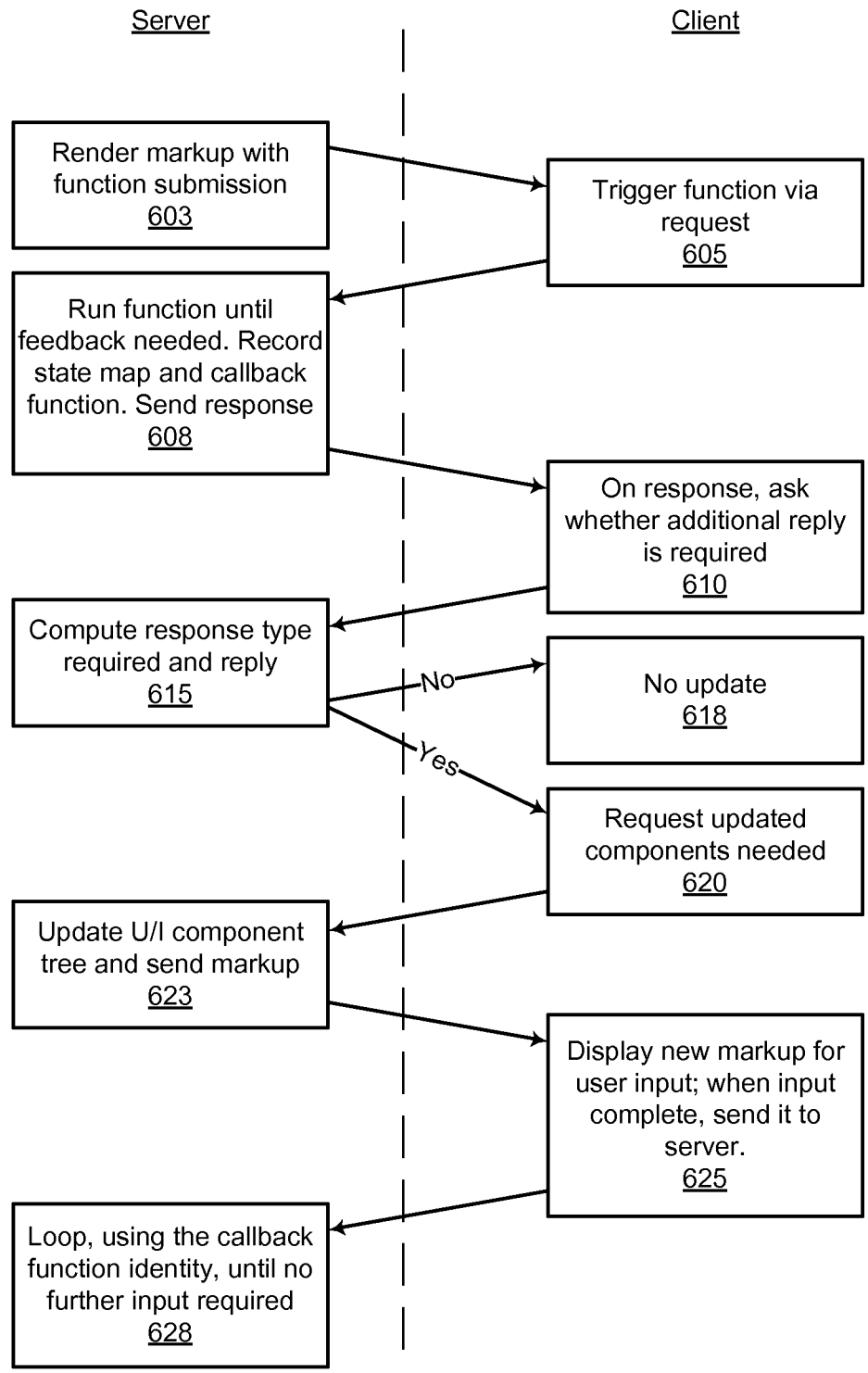
FIG. 6 is a schematic block flow diagram illustrating asynchronous interactions between a server and a client, after synchronous-to-asynchronous conversion of an application, according to an embodiment of the present invention.
Figure 10:
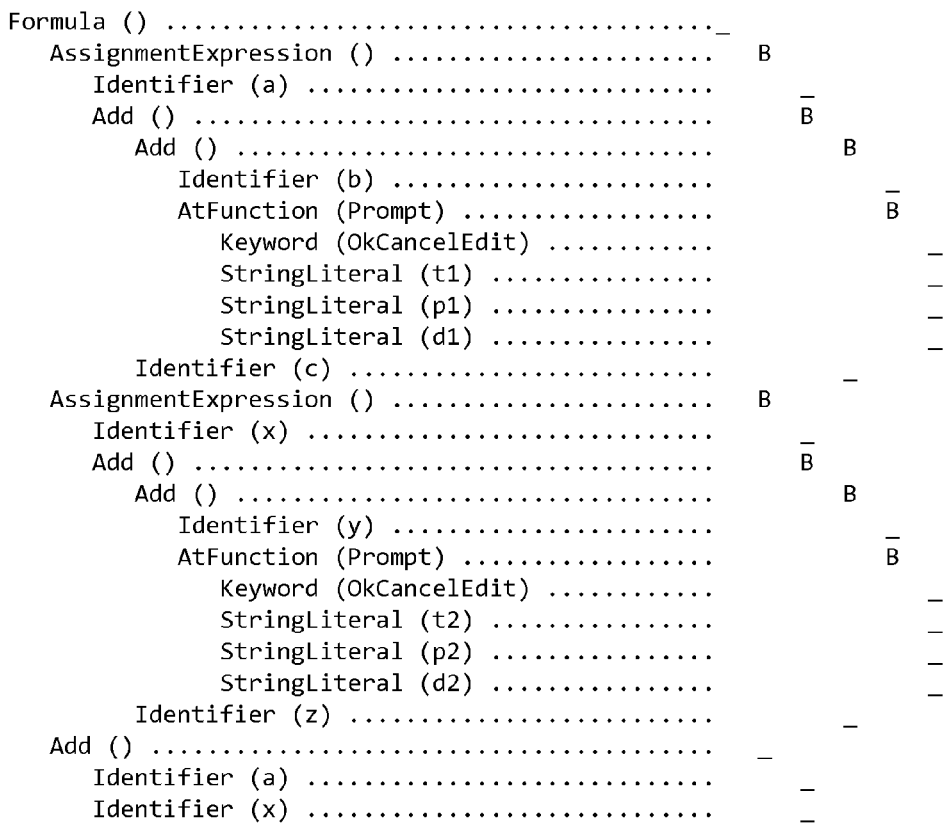

1. Perform a left-order tree traversal to determine data types of nodes using a registry
2. Perform a right-order traversal of the tree to identify and promote blocking and boundary elements FIG. 6 is a schematic block flow diagram illustrating asynchronous interactions between a server and a client, implemented for each user interface function call, after synchronous-to-asynchronous conversion of an application, according to an embodiment of the present invention. FIG. 6 shows, on the left-hand side, processes running on a server and, on the right hand side, processes running on the client. In process 603, there is served to the client a presentation screen, configured to enable the client to notify the server in the event of a client request for a presentation layer action. In process 605, the client sends to the server a request for presentation layer action. In process 608, the server runs logical processes until client input is required. At that point the server stores a callback function, and optionally context information, and sends to the client a response to the client request. The client in process 610 next sends to the server a message asking whether additional user input is required. In process 615, the server sends to the client a response message indicating whether additional user input is required. If no addition user input is required, at process 618, the client is so informed. In process 620, if additional user input is required, the client sends to the server a request for a presentation characterization by which the additional user input obtained. In process 623, the server generates the presentation characterization and sends the presentation characterization to the client. In process 625, the client displays the new presentation characterization and obtains the additional input. When the input is complete, the client sends the input to the server. In process 628, the server loops if necessary, using the callback function identity (and, optionally, the stored context information), until there is no further input required.

Examples of Translations

As noted, a synchronous application program is analyzed to generate a series of asynchronous application program segments. The analysis lexical analysis of the synchronous application program, i.e., generation of tokens, based on a grammar for the computer language in which the synchronous application program was written. A lexer (i.e., a lexical analyzer or tokener) may use a standard ANTLR grammar to lexically analyze the synchronous application program. Similarly, a standard ANTLR grammar may be used to read the tokens and generate a corresponding concrete syntax tree. The concrete syntax tree may be converted to a custom Formula (for example) abstract syntax tree (AST), based on an Eclipse Modeling Framework (EMF) model, another suitable model or a grammar processing tool, such as String Templates. The AST may then be analyzed, bottom-up, to mark functions as being blocking or non-blocking, based on definitions of the functions stored in a configuration file or other store. Code block that are reachable by GOTO constructs (if supported by the source langue) are marked. Each expression may then be marked as blocking or non-blocking, based on whether its children are blocking. The AST may then be transformed to emit a modified AST.

Statements containing blocking function calls are expanded, and the blocking functions are promoted to unary statements to provide a clear boundary between blocking and non-blocking statements, as well as to prevent nested blocking function calls. Complex expressions that contain blocking function calls are simplified until they contain nothing except blocking unary function calls or assignment expressions. Some Flow Control constructs may be incompatible between the source language (for example, LotusScript) and the target language (for example, Java). The AST is modified to ensure clear boundaries exist between callable statement blocks, in addition to the above processes. Optionally, optimizations may then be performed on the AST to remove redundancy.

Statements containing blocking function calls are expanded and the blocking functions are promoted to unary statements to provide a clear boundary between blocking and non-blocking statements as well as prevent nested blocking function calls. If a statement has one or more arguments which are blocking it will be simplified. All non-primitive arguments, up to and including the blocking statements, are promoted to temporary assignment expressions to prevent side-effects. For example, if the source language is LotusScript and the code contains:

If ws.DialogBox("dialogForm", . . . ) Then the generated code may be of the form:

t1 =ws.DialogBox("dialogForm", ...)
If t1 Then

An in-line optimization may be performed to identify cases where there are no side-effects and promotion of preceding arguments is not necessary.

Examples of such transformations are presented next.

A function that has one or more arguments that are blocking is simplified. All arguments, up to and including the blocking ones, are promoted to temporary assignment expressions.

Complex expressions that contain blocking functions are simplified, until they contain nothing except blocking unary or assignment expressions. An expression is considered complex if it contains one or more blocking functions and is not in one of the two following forms:

@Blocking( ) ; or
x := @Blocking( ) ;

For complex expressions, all primitive expressions up to and including the blocking ones are promoted to temporary assignment expressions, and the original expression is replaced with one that refers to the temporary variables.

Some Flow Control constructs may be incompatible between the source language (LotusScript) and the target language (Java). The AST is modified to ensure clear boundaries between callable statement blocks, in addition to the above processes. Examples of incompatible flow control construct are the following LotusScript constructs: GOTO, ON ERROR GOTO and RESUME. Code Appendix B, which is hereby incorporated herein, contains an example of flow control conversion.

Various optimizations may then be performed on the AST to remove redundancy. An example of this type of optimization is redundant nested statement blocks, with no side-effects or conditional execution. These would be rolled-up into a single statement block.

FIG. 7 shows, on the top, an exemplary single blocking expression synchronous @Formula code snippet and, on the bottom, a corresponding abstract syntax tree (AST) representation of the code snippet. A "B" in the AST designates a blocking node, i.e., either the node itself or a child node is blocking. The AST is automatically generated from the code snippet by parsing the code snippet, as discussed above. The code snippet includes a function call ("@Prompt"), which displays a dialog box with a prompt (specified by one of the character string parameters to the function call) on the user interface. The dialog box includes three buttons ("OK," "Cancel" and "Edit"). The function returns one of three possible values, depending on which of the three buttons the user clicks. The code snippet calculates a sum of: the value of a variable named "y;" the value returned by the function; and the value stored in a variable named "z." The code snippet then stores the sum in a variable named "x." Clearly, the sum cannot be calculated until the user input has been received. Thus, the code snippet includes a signature indicating need for a boundary.

FIG. 8 shows, on the right side, a semantically equivalent translated AST (for Formula code) that is automatically generated from the AST of FIG. 7 and, on the left side, semantically equivalent Formula code that may be automatically generated from the AST of FIG. 8, according to embodiments of the present invention. The generated code includes two asynchronous code segments, separated by a boundary. The AST of FIG. 8 is automatically generated from the AST of FIG. 7, and the two asynchronous code segments of FIG. 8 are automatically generated from the AST of FIG. 8, as discussed above, with respect to FIG. 5.

In the first generated code segment, the value of the variable named "y" is stored in a temporary location named "tmp_0," and the @Prompt function is invoked. The first code segment execution then ends. Once the user has clicked on one of the buttons, the value returned by the @Prompt function is stored in a variable named "tmp_1," and second code segment begins executing. The second code segment adds the values stored in the temporary variables tmp_0 and tmp_1 and the value stored in "z" and stores the sum in the variable named "x."

Similarly, FIG. 9 shows semantically equivalent Server-Side JavaScript (SSJS) code that may be automatically generated in a similar manner, according to embodiments of the present invention, as discussed above with respect to FIG. 5.

Nested @Do expressions are reduced to a single @Do or a sequence of expressions. In cases of an @Do which is a direct child of an @Do or a Formula then inner @Do is removed. For example:

```
@Do(
    x := 1 ;
    @Do(
        a := 1 ;
```

```
        b := 2 ;
    );
    y := 2
);
``` may be translated into:

```
@Do(
    x := 1 ;
    a := 1 ;
    b := 2 ;
    y := 2
);
```

In a manner similar to that of FIGS. 7-9, FIGS. 10-13 show input Formula code and AST (FIG. 10), translated Formula AST (FIG. 11), generated Formula code (FIG. 12) and generated SSJS code (FIG. 13) of two blocking expressions.

In a manner similar to that of FIGS. 7-9, FIGS. 14-16 show input Formula code and AST (FIG. 14), translated Formula AST and generated Formula code (FIG. 15) and generated SSJS code (FIG. 16) of a blocking @if condition. The @if function has the following syntax:

```
@If( <Condition>; <Result_If_True>; [<ElseIf_Condition>;
    <Result_If_True>;]* <Result_If_False>);
```

Where the [ ]* can be present n times for n>=0.

In a manner similar to that of FIGS. 7-9, FIGS. 17-19 show input Formula code and AST (FIG. 17), translated Formula AST and generated Formula code (FIG. 18) and generated SSJS code (FIG. 19) of a blocking @If 'then' expression. The "@Prompt" function call need not be promoted, because the function call is within its own statement block, which needs to be conditionally executed, i.e., the value of the function call cannot be assigned to a temporary variable above (i.e., earlier than) the "If" instructions.

In a manner similar to that of FIGS. 7-9, Code Appendix A, which is hereby incorporated herein, contains four additional examples of automatic translations. These examples assume LotusScript source language and Java Interface destination language.

The systems and methods for automatic converting a synchronous application, in which logic and presentation software may run locally on a single computer, to an asynchronous application, described above, may be implemented as computer instructions stored in a memory and executed by a processor. The memory may be random access memory (RAM), read-only memory (ROM), flash memory or any other memory, or combination thereof, suitable for storing control software or other instructions and data. Some of the functions performed by the system have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of system have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiment(s).

What is claimed is:

1. A computer-implemented method of generating asynchronous application program output computer code from input computer code of a synchronous application, the method comprising:
    automatically parsing the input computer code to develop an original syntax tree;
    automatically developing, from the original syntax tree, a translated syntax tree that is semantically equivalent to the original syntax tree;
    automatically analyzing at least one of the original syntax tree and the translated syntax tree to identify a plurality of nodes, each node representing a respective instruction that potentially might not be executed as a result of a respective logical contingency;
    automatically defining a boundary in the translated syntax tree logically prior to each identified node; and
    automatically generating a plurality of asynchronous output computer code segments, such that for each generated segment:
        the segment corresponds to one of the defined boundaries;
        the segment contains output computer code generated from a portion of the translated syntax tree;
        at least a portion of the generated output computer code depends on a result of the respective logical contingency; and
        the segment contains no output computer code that implements the respective logical contingency, such that:
            the generated plurality of asynchronous output computer code segments:
                are executable via a server; and
                comprise an application logic layer configured to communicate with a client executing a presentation layer for the synchronous application; wherein:
            the input computer code of the synchronous application comprises logic and presentation layers that run locally on a single computer.

2. A method according to claim 1, wherein generating the plurality of asynchronous output computer code segments comprises generating the plurality of asynchronous output computer code segments, such that for each generated segment a logically earlier segment does contain output computer code that implements the respective logical contingency.

3. A method according to claim 1, wherein analyzing the at least one of the original syntax tree and the translated syntax tree comprises analyzing the at least one of the original syntax tree and the translated syntax tree to identify the plurality of nodes, each node representing a respective instruction that potentially might not be executed as a result of a respective logical contingency, wherein the logical contingency comprises at least one of: a user interface instruction; a transfer of control instruction; an external entry point; and a reference to a loosely-defined variable type.

4. A method according to claim 1, wherein the input computer code of the synchronous application is of a first computer programming language; and developing the translated syntax tree comprises developing a translated syntax tree according to a second computer programming language different than the first computer programming language.

5. A method according to claim 1, wherein:
    analyzing the at least one of the original syntax tree and the translated syntax tree comprises analyzing at least one of the original syntax tree and the translated syntax tree to identify user-interface function calls and nodes of the at least one of the original syntax tree and the translated syntax tree that are dependent on such function calls;
    developing the translated syntax tree comprises developing, from the original syntax tree, a translated syntax tree wherein:
        the user interface calls are mapped to corresponding translated calls in a client user interface; and
        each node dependent on a given call is mapped to follow the translated call corresponding to the given call; and
    generating the plurality of asynchronous output computer code segments comprises generating a plurality of asynchronous output computer code segments that implement an asynchronous client-server model.

6. A method according to claim 5, further comprising:
    before generating output code, remapping the syntax tree according to a dependent program flow.

7. A method according to claim 5, wherein the asynchronous client-server model includes processes, for each user interface function call, comprising:
    serving to the client a presentation screen, configured to enable the client to notify the server in the event of a client request for a presentation layer action;
    running logical processes until client input is required;
    storing a callback function and sending to the client a response to the client request;
    receiving from the client a message asking whether additional user input is required;

sending to the client a response message indicating whether additional user input is required;
if additional user input is required,
receiving from the client a request for a presentation characterization by which the additional user input can be obtained;
generating the presentation characterization;
sending the presentation characterization to the client; and
receiving the additional user input; and
running the callback function.

8. A method according to claim 7, further comprising:
repeating the foregoing processes, beginning at the point of storing the callback function, until no further user input is required.

9. A method according to claim 5, wherein the input code is written in a language and the output code is written in the same language.

10. A method according to claim 5, wherein the input code is written in a first language and the output code is written in a second language that is different from the first language.

11. A method according to claim 9, wherein the language is JavaScript.

12. A method according to claim 9, wherein the language is Java.

13. A method according to claim 10, wherein the first language is @Formula and the second language is JavaScript.

14. A method according to claim 10, wherein the first language is LotusScript and the second language is Java.

15. A method according to claim 10, wherein the first language is Visual Basic and the second language is C#.

16. A method according to claim 10, wherein the first language is Visual Basic and the second language is Java.

17. A computer-implemented system for automatically generating asynchronous application program output computer code from input computer code of a synchronous application, comprising:
a parser configured to automatically parse the input computer code to develop an original syntax tree;
a syntax tree transformer configured to automatically develop, from the original syntax tree, a translated syntax tree that is semantically equivalent to the original syntax tree;
an analyzer configured to:
automatically analyze at least one of the original syntax tree and the translated syntax tree to identify a plurality of nodes, each node representing a respective instruction that potentially might not be executed as a result of a respective logical contingency; and
automatically define a boundary in the translated syntax tree logically prior to each identified node; and
a code generator configured to automatically generate a plurality of asynchronous output computer code segments, such that for each generated segment:
the segment corresponds to one of the defined boundaries;
the segment contains output computer code generated from a portion of the translated syntax tree;
at least a portion of the generated output computer code depends on a result of the respective logical contingency; and
the segment contains no output computer code that implements the respective logical contingency, such that:
the generated plurality of asynchronous output computer code segments:
are executable via a server; and
comprise an application logic layer configured to communicate with a client executing a presentation layer for the synchronous application; wherein:
the input computer code of the synchronous application comprises logic and presentation layers that run locally on a single computer.

18. A system according to claim 17, wherein the code generator is configured to generate the plurality of asynchronous output computer code segments, such that for each generated segment a logically earlier segment does contain output computer code that implements the respective logical contingency.

19. A system according to claim 17, wherein the logical contingency comprises at least one of: a user interface instruction; a transfer of control instruction; an external entry point; and a reference to a loosely-defined variable type.

20. A system according to claim 17, wherein the input computer code of the synchronous application is of a first computer programming language; and the syntax tree transformer is configured to develop the translated syntax tree according to a second computer programming language different than the first computer programming language.

21. A computer-implemented method of generating output computer code, for an application executable via a server, the application including an application logic layer and being in communication with a client running a presentation layer for the application, from input computer code of a synchronous application in which the logic and presentation layers run locally on a single computer, the method including computer processes comprising:
parsing the input computer code to develop an original syntax tree;
analyzing the original syntax tree to identify user-interface function calls and nodes of the tree that are dependent on such function calls;
developing, from the original syntax tree, a translated syntax tree, wherein:
(a) the user interface calls are mapped to corresponding translated calls in a client user interface; and
(b) each node dependent on a given call is mapped to follow the translated call corresponding to the given call; and
generating output code, from the translated syntax tree, that implements an asynchronous client-server model, the output code comprising a plurality of asynchronous output code segments, which:
are executable via a server; and
comprise an application logic layer configured to communicate with a client executing a presentation layer for the synchronous application; wherein:
the input computer code of the synchronous application comprises logic and presentation layers that run locally on a single computer.

22. A computer-implemented method of generating asynchronous application program output computer code from input computer code of a synchronous application, the method comprising:
automatically parsing the input computer code to develop an original syntax tree;
automatically developing, from the original syntax tree, a translated syntax tree that is semantically equivalent to the original syntax tree;
automatically analyzing at least one of the original syntax tree and the translated syntax tree to identify:

a plurality of nodes, each node representing a respective instruction that potentially might not be executed as a result of a respective logical contingency; and user-interface function calls and nodes of the at least one of the original syntax tree and the translated syntax tree that are dependent on such function calls;

automatically defining a boundary in the translated syntax tree logically prior to each identified node;

wherein developing the translated syntax tree comprises developing, from the original syntax tree, a translated syntax tree such that:

the user interface function calls are mapped to corresponding translated calls in a client user interface; and each node dependent on a given call is mapped to follow the translated call corresponding to the given call; the method further comprising:

automatically generating a plurality of asynchronous output computer code segments that implement an asynchronous client-server model, such that for each generated segment:

the segment corresponds to one of the defined boundaries;

the segment contains output computer code generated from a portion of the translated syntax tree;

at least a portion of the generated output computer code depends on a result of the respective logical contingency; and the segment contains no output computer code that implements the respective logical contingency.

23. A method according to claim 22, wherein:

the input computer code of the synchronous application comprises logic and presentation layers that run locally on a single computer; and generating the plurality of asynchronous output computer code segments comprises generating the plurality of asynchronous output computer code segments, such that the generated plurality of asynchronous output computer code segments:

are executable via a server; and comprise an application logic layer configured to communicate with a client executing a presentation layer for the synchronous application.

24. A computer-implemented system for automatically generating asynchronous application program output computer code from input computer code of a synchronous application, comprising:

a parser configured to automatically parse the input computer code to develop an original syntax tree;

a syntax tree transformer configured to automatically develop, from the original syntax tree, a translated syntax tree that is semantically equivalent to the original syntax tree;

an analyzer configured to:

automatically analyze at least one of the original syntax tree and the translated syntax tree to identify:

a plurality of nodes, each node representing a respective instruction that potentially might not be executed as a result of a respective logical contingency; and user-interface function calls and nodes of the at least one of the original syntax tree and the translated syntax tree that are dependent on such function calls; and automatically define a boundary in the translated syntax tree logically prior to each identified node;

wherein the syntax tax tree transformer is further configured to automatically develop the translated syntax tree, such that:

the user interface function calls are mapped to corresponding translated calls in a client user interface; and each node dependent on a given call is mapped to follow the translated call corresponding to the given call; and further comprising a code generator configured to automatically generate a plurality of asynchronous output computer code segments that implement an asynchronous client-server model, such that for each generated segment:

the segment corresponds to one of the defined boundaries;

the segment contains output computer code generated from a portion of the translated syntax tree;

at least a portion of the generated output computer code depends on a result of the respective logical contingency; and the segment contains no output computer code that implements the respective logical contingency.

* * * * *